US008079461B2

(12) United States Patent
Masuda et al.

(10) Patent No.: US 8,079,461 B2
(45) Date of Patent: Dec. 20, 2011

(54) BELT DRIVING CONTROL DEVICE, BELT DRIVING CONTROL METHOD, AND IMAGE FORMING APPARATUS

(75) Inventors: Noritaka Masuda, Ibaraki (JP); Hiromichi Matsuda, Kanagawa (JP); Keisuke Saka, Ibaraki (JP)

(73) Assignee: Ricoh Company Ltd., Tokyo (JP)

( * ) Notice: Subject to any disclaimer, the term of this patent is extended or adjusted under 35 U.S.C. 154(b) by 266 days.

(21) Appl. No.: 12/585,471

(22) Filed: Sep. 16, 2009

(65) Prior Publication Data

US 2010/0082163 A1 Apr. 1, 2010

(30) Foreign Application Priority Data

Sep. 16, 2008 (JP) ................................. 2008-237136
Sep. 7, 2009 (JP) ................................. 2009-206160

(51) Int. Cl.
*B65G 37/00* (2006.01)

(52) U.S. Cl. ..................................... 198/571; 198/464.1

(58) Field of Classification Search ............... 198/464.1, 198/464.3, 571, 575, 577
See application file for complete search history.

(56) References Cited

U.S. PATENT DOCUMENTS 4,557,711 A * 12/1985 Yamanashi et al. ........... 198/571
5,170,707 A * 12/1992 Thoma .......................... 474/117
5,186,308 A * 2/1993 Munro .......................... 198/572
6,227,351 B1 * 5/2001 Leisner ......................... 198/571
6,761,263 B2 * 7/2004 Becker et al. ................. 198/577
7,251,444 B2 * 7/2007 Matsuda et al. .............. 399/301

FOREIGN PATENT DOCUMENTS

JP 2006-264976 10/2006

* cited by examiner

*Primary Examiner* — James R Bidwell
(74) *Attorney, Agent, or Firm* — Harness, Dickey & Pierce, PLC

(57) ABSTRACT

A belt driving control device that includes a belt, a driving roller transmitting drive force to the belt, a belt phase detecting section detecting a phase of the belt, a correction amount computing section computing a correction amount of a belt travelling velocity corresponding to the detected phase of the belt for cancelling out fluctuation in the belt travelling velocity corresponding to the detected phase of the belt, and a storage section storing the correction amount of the belt travelling velocity corresponding to the detected phase of the belt. The belt driving control device further includes a driving control section retrieving the correction amount of the belt travelling velocity corresponding to the phase of the belt and controlling drive of the driving roller to cancel out the fluctuation in the belt travelling velocity based on the retrieved correction amount of the belt travelling velocity corresponding to the detected phase of the belt.

7 Claims, 8 Drawing Sheets

BELT DRIVING CONTROL DEVICE, BELT DRIVING CONTROL METHOD, AND IMAGE FORMING APPARATUS

BACKGROUND OF THE INVENTION

1. Field of the Invention

The present invention generally relates to a belt driving control device configured to control a belt looped over plural rollers, a belt device having the belt driving control device, a belt driving control method, and an image forming apparatus having the belt device.

2. Description of the Related Art

In the related art, there is provided an image forming apparatus having such a belt, such as a photoreceptor belt, an intermediate transfer belt, and a sheet transfer conveyor belt. In this type of image forming apparatus, high degrees of accuracy in controlling the drive of the belt may be a prerequisite in order to insure high image quality. Specifically, in a tandem type image forming apparatus having a direct transfer system capable of exhibiting an excellent image forming speed and suitable for reduction in size, high degrees of accuracy may be required for controlling the drive of a conveyance belt that conveys a recording sheet (i.e., a sheet-type recording medium). In the image forming apparatus, the recording sheet is conveyed by the conveyance belt and sequentially passed through each of plural image forming units arranged along a conveyance direction such that mutually different homochromatic images are formed on the recording sheet. The different homochromatic images are individually superimposed on one over another to thus form the color images on the recording sheet.

FIG. 8 shows one example of the tandem type electrophotographic image forming apparatus having an intermediate transfer system. Reference numerals 22, 23, 24 respectively indicate a conveyance belt, a driving roller, and a driven roller. Further, reference numerals 21Y, 21M, 21C, 21K each indicate one of image forming units.

In the image forming apparatus, for example, the image forming units 21Y, 21M, 21C, and 21K that form corresponding homochromatic images in colors of yellow (Y), magenta (M), cyan (C), and black (K) are arranged in a travelling direction of conveyance of a recording sheet. Electrostatic latent images formed on surfaces of unshown photoconductor drums 12Y, 12M, 12C, and 12K are then developed by exposure of laser from a laser exposure unit 21 at the corresponding image forming units 21Y, 21M, 21C, and 21K to form corresponding homochromatic toner images (perceivable images). The homochromatic toner images are attached to the conveyance belt 22 by electrostatic force, and sequentially transferred from the conveyance belt 22 onto the recording sheet (not shown) such that the homochromatic toner images are sequentially superimposed on the recording sheet. Thereafter, toner of the superimposed images are fused and pressed by a fixation device 17, thereby forming color images fixated on the recording sheet.

The conveyance belt 22 is looped with adequate tension over a driving roller 23 and a driven roller 24 arranged in parallel with each other. The driving roller 23 is rotationally driven at a predetermined rotational velocity by unshown driving motor and the conveyance belt 22 endlessly travels at a predetermined velocity according to the rotation of the driving roller 23. The recording sheet is supplied by a paper-feeding mechanism on a portion of the conveyance belt 22 located at a side where the image forming units 21Y, 21M, 21C, and 21K are arranged, and conveyed at the same velocity as the travelling velocity of the conveyance belt 22. Thus, the recording sheet is passed through each of the image forming units arranged in series.

In the image forming apparatus, failure to maintain the travelling velocity of the recording sheet or the travelling velocity of the conveyance belt 22 at a constant value results in color shifts. Such color shifts result from relative shifts in transferring positions of the homochromatic images that are alternately superimposed on the recording sheet. The color shifts may result in blurring fine line images formed by superimposing images of plural colors or white dot defects around profiles of black character images in the background image formed by superimposing images of plural colors.

FIG. 9 shows another example of the tandem type electrophotographic image forming apparatus having the intermediate transfer system. In the intermediate transfer system of the tandem type electrophotographic image forming apparatus, the homochromatic images individually formed on the corresponding surfaces of photoconductor drums 12Y, 12M, 12C, and 12K of the image forming units 21Y, 21M, 21C, and 21K are temporarily transferred on the intermediate transfer belt 16 such that the images are sequentially superimposed on one over another, and the superimposed images are transferred on the recording sheet at once.

In this tandem type electrophotographic image forming apparatus having the intermediate transfer system, the color shifts may also be generated if the intermediate transfer belt 16 does not travel at a constant velocity. In the image forming apparatus, including the aforementioned tandem type image forming apparatus, utilizing a belt as a conveyance member for conveying a recording material or as an image carrier including a photoconductor or an intermediate transfer member for carrying the images transferred on the recording material, failure to maintain the travelling velocity of the belt at a constant value may result in banding. The banding indicates image density heterogeneity that results from fluctuations in the travelling velocity of the belt while images are being transferred on the recording material. Specifically, a portion of the image transferred on the intermediate transfer belt 16 when the travelling velocity of the belt is relatively fast has a profile extended in a circumferential direction (i.e., travelling direction) of the belt whereas a portion of the image transferred on the intermediate transfer belt 16 when the travelling velocity of the belt is relatively slow has a profile shrunk in the circumferential direction of the belt, in comparison to the original profile of the image. The extended portion of the image has low density while the shrunk portion has high density. As a result, the image density heterogeneity in the circumferential direction of the belt or banding is observed. The banding is clearly perceived with the naked eye when pale homochromatic images are formed.

The travelling velocity of the belt varies with various factors including inconsistency of a belt thickness if the belt is formed of a single layer. The thickness inconsistency of the belt results from thickness variation of the belt in the circumferential direction which is manufactured with a cylindrical mold by a centrifugal baking system. In the belt having such a thickness variation in the circumferential direction of the belt, the travelling velocity of the belt increases when a thicker portion of the belt is looped over the driving roller whereas the velocity decreases when a thinner portion of the belt is looped over the driving roller. The thickness inconsistency or thickness variation results in fluctuation in the travelling velocity of the belt.

Japanese Patent Application Laid-Open No. 2006-264976 discloses an image forming apparatus having a belt driving control device capable of controlling such thickness inconsistency of the belt. In the disclosed image forming apparatus, a correcting amount for the driving roller to control is computed based on information on the rotational angular displacements or rotational angular velocities of the two rollers individually having different diameters. The rotational velocity of the driving roller is then controlled based on the computed correcting amount obtained in order to cancel out the fluctuation in the belt travelling velocity due to the thickness variation of the belt in the circumferential direction of the belt. The disclosed document also includes a method of synchronizing the correcting amount with the thickness fluctuation, in which a reference mark is provided on the belt as a home position, and the marked home position on the belt is scanned by an optical sensor or the like to detect the home position. In the disclosed document, there is a method of synchronizing the correcting amount with the thickness fluctuation without having the reference mark placed on the belt as the home position. In this method, the accumulated value of the rotational angular velocity of a roller obtained by an encoder mounted on the roller supporting the belt is computed. A virtual home position is then determined as a position at which the computed accumulated value has reached a prescribed value.

However, the belt driving control device in the image forming apparatus according to the related art cancels out the fluctuation in the belt travelling velocity resulting from the thickness variation of the belt only after the home position or the virtual home position of the belt has been detected. In this case, though depending on where the home position of the belt is, the belt control device may have to wait (i.e., waiting time) until the belt has been driven to travel one rotation to reach the home position again in order to cancel out the fluctuation in the belt travelling velocity. In the image forming apparatus such as a printer or a copier having the belt driving control device, it is desirable that duration of time (hereinafter called "first print time"), which indicates the time from the time at which the print starting command given by an operation unit or a superordinate apparatus is received to the time at which the printed matter is discharged onto a discharge tray of the image forming apparatus, is as short as possible. In order to provide uniform image quality, it is generally preferable that images be formed after fluctuation of the belt travelling velocity has been stabilized. Accordingly, in such an image forming apparatus, it is desirable that the aforementioned waiting time is made as short as possible because the waiting time is directly added to the first print time.

SUMMARY OF THE INVENTION

Accordingly, embodiments of the present invention may provide a novel and useful belt driving control device, belt driving control method, and image forming apparatus solving one or more of the problems discussed above. More specifically, the embodiments of the present invention may provide a belt driving control device, a belt driving control method, and an image forming apparatus capable of reducing such first print time.

A belt driving control device according to an embodiment of the invention includes a belt, a driving roller over which the belt is looped and configured to transmit drive force to the belt to be traveled, a belt phase detecting section configured to detect a phase of the belt, a correction amount computing section configured to compute a correction amount of a belt travelling velocity corresponding to the detected phase of the belt for cancelling out fluctuation in the belt travelling velocity corresponding to the detected phase of the belt, a storage section configured to store the correction amount of the belt travelling velocity corresponding to the detected phase of the belt, and a driving control section configured to retrieve the stored correction amount of the belt travelling velocity corresponding to the detected phase of the belt from the storage section, and control drive of the driving roller to cancel out the fluctuation in the belt travelling velocity based on the retrieved correction amount of the belt travelling velocity corresponding to the detected phase of the belt.

An image forming apparatus according to an embodiment of the invention includes the aforementioned belt driving control device.

A method for controlling drive of a belt looped over a driving roller that transmits drive force to the belt according to an embodiment of the invention includes detecting a phase of the belt, computing a correction amount of a belt travelling velocity corresponding to the detected phase of the belt for cancel out fluctuation in the belt travelling velocity corresponding to the detected phase of the belt, storing the correction amount of the belt travelling velocity corresponding to the detected phase of the belt, retrieving the stored correction amount of the belt travelling velocity corresponding to the detected phase of the belt, and controlling the driving roller to cancel out the fluctuation in the belt travelling velocity based on the retrieved correction amount of the belt travelling velocity corresponding to the detected phase of the belt.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

A description is given below, with reference to the FIGS. 1 through 7 of embodiments of the present invention.

Figure 2:
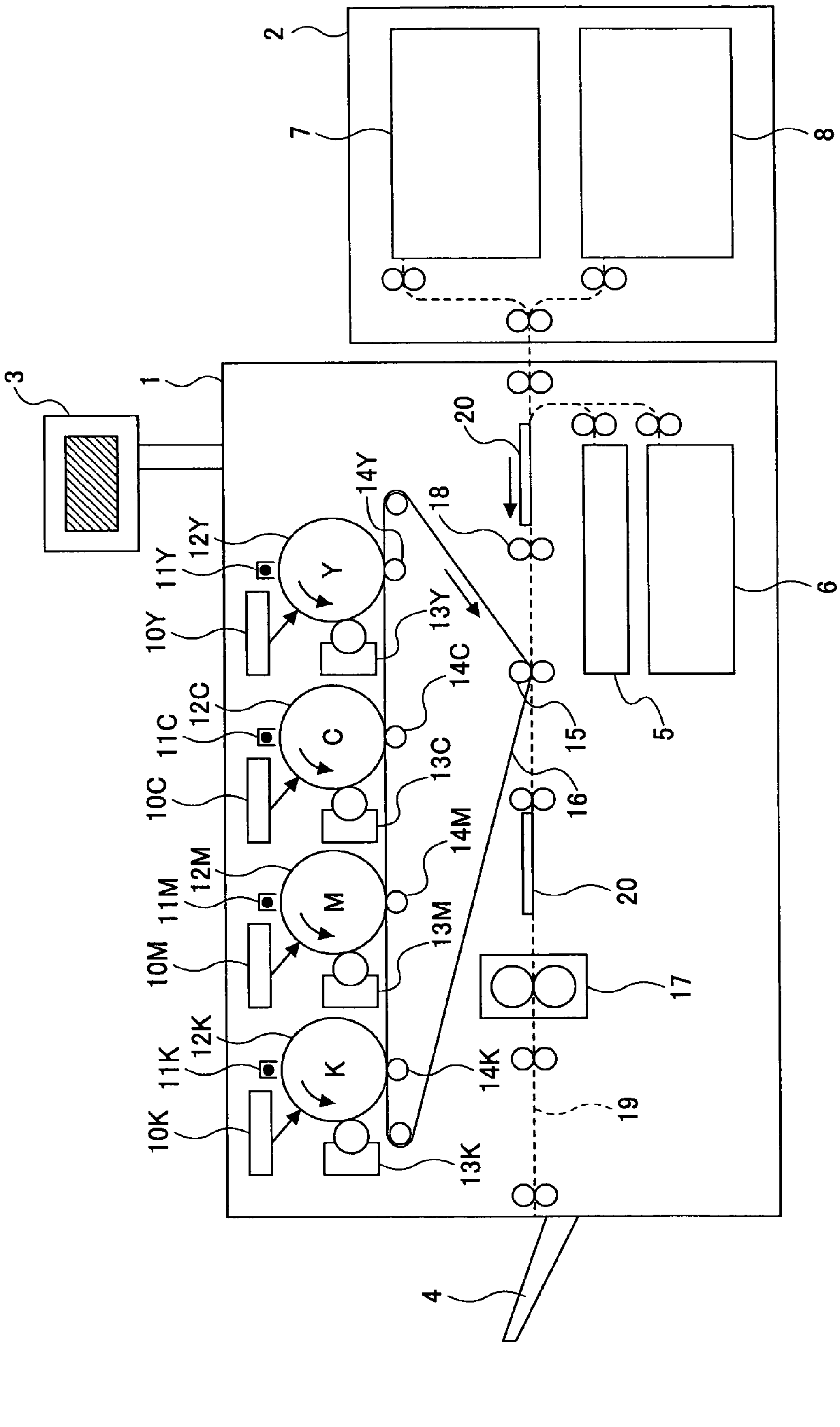
FIG. 2 is a block diagram illustrating an image forming apparatus according to the embodiment of the invention.

FIG. 2 is a schematic diagram illustrating a tandem type color laser printer employing an embodiment of the invention. A printer main body 1 includes an intermediate transfer belt 16, a fixation device 17, a secondary transfer roller 15, four color laser scanning units 10Y to 10K, photoconductor drums 12Y to 12K, electrifiers 11Y to 11K, developing devices 13Y to 13K, primary rollers 14Y to 14K, a first paper-feeding hopper 5, and a second paper-feeding hopper 6. An expansion paper-feeding device 2 includes a third paper-feeding hopper 7 and a fourth paper-feeding hopper 8. The expansion paper-feeding device 2 is connected to the printer main body 1.

The first, second, third, and fourth paper-feeding hoppers 5, 6, 7, and 8 each contain paper 20, one of which a user can select by operating an operating panel 3 or an unshown input terminal such as a PC. The printer main body 1 starts printing based on receiving a print starting instruction given by an unshown superordinate apparatus. For example, the paper 20 is fed from one of the paper-feeding hoppers to a conveyance path 19, and conveyed through the conveyance path 19 by rotationally driven conveyance rollers. As a result, images are formed on the paper 20 and the paper on which image has been formed is then discharged onto a discharge tray 4.

The following describes image formation processes (1) to (6).

(1) The photoconductor drums 12Y to 12K each rotating at a constant velocity are electrified by the corresponding electrifiers 11Y to 11K.

(2) Latent images are formed on the photoconductor drums 12Y to 12K by the application of laser beams that are modulated based on the image data electrically expressed by the laser scanning units 10Y to 10K.

(3) The developing devices 13Y to 13K develop the latent images on the photoconductor drums 12Y to 12K by attaching toner of corresponding colors to the latent images.

(4) The toner of individual colors attached to the corresponding photoconductor drums 12Y to 12K are sequentially transferred on an endless intermediate transfer belt 16 rotated by primary transfer rollers 14Y to 14K.

(5) The toner of all individual colors transferred on the endless intermediate transfer belt 16 is transferred simultaneously on the paper 20 conveyed through the conveyance path 19 by rotating the secondary transfer roller 15.

(6) The toner now transferred on the paper 20 is fixated by the application of heat and pressure from the fixation device 17.

Figure 1:
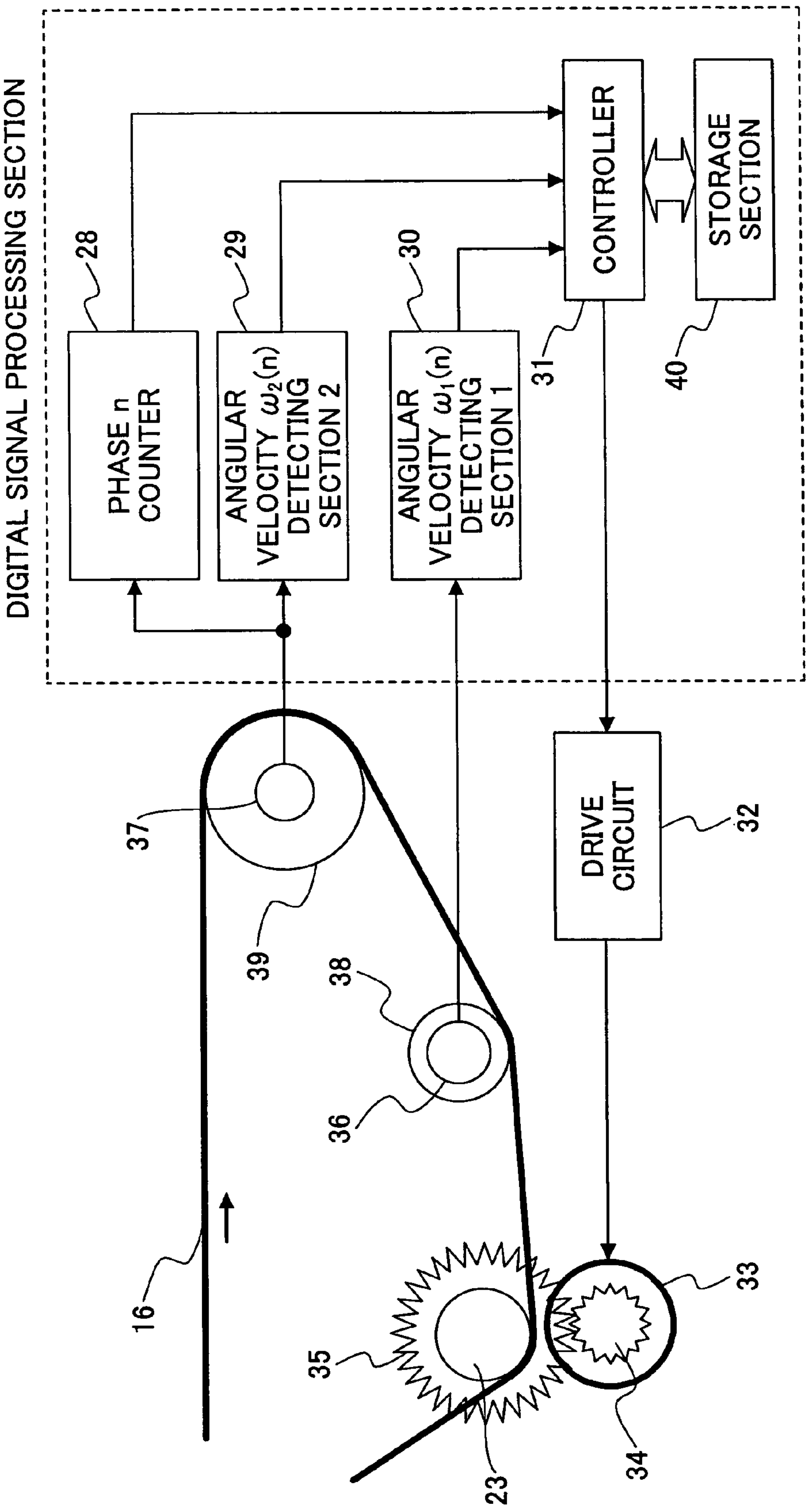
FIG. 1 is a schematic diagram illustrating a belt driving control device according to an embodiment of the invention.

FIG. 1 is a schematic diagram illustrating a drive section of the intermediate transfer belt according to the embodiment of the invention. A digital signal processing section utilized as a control section includes sections enclosed by a broken line that may be operated as hardware such as a CPU, a memory and the like, and as software. The driving roller 23 is driven by rotational force generated by an intermediate transfer belt driving motor 33 via a first gear 34 and a second gear 35. The intermediate transfer belt 16 is rotated by the driving roller 23 that is brought in contact with the intermediate transfer belt 16. A first rotary encoder 36 is attached to a first driven roller 38 that supports the intermediate transfer belt 16, and pulse signals are output from the first rotary encoder 36 based on the rotational velocity of the first driven roller 38. The pulse signal is supplied to an angular velocity $\omega\mathbf{1}(n)$ detecting section 30, and an angular velocity $\omega\mathbf{1}(n)$ detected by the angular velocity $\omega\mathbf{1}(n)$ detecting section 30 is transferred to a controller 31 whenever the angular velocity $\omega\mathbf{1}(n)$ detecting section 30 receives a value of the angular velocity $\omega\mathbf{1}(n)$. Likewise, in the second driven roller 39, the pulse signal is supplied to an angular velocity $\omega\mathbf{2}(n)$ detecting section 29, and an angular velocity $\omega\mathbf{2}(n)$ detected by angular velocity $\omega\mathbf{2}(n)$ detecting section 29 is also transferred to the controller 31 in the same manner as the first driven roller 38. The controller 31 controls the intermediate transfer belt driving motor 33 so as to cancel out the fluctuation in the belt travelling velocity due to the thickness variation of the aforementioned intermediate transfer belt 16. Note that n is a natural number that represents a phase of the intermediate transfer belt 16. Details of a method for computing the correction data δCLK(n) are described later.

In the embodiment of the invention, a stepping motor is employed as the intermediate transfer belt driving motor 33. Accordingly, the frequency of a driving clock signal input to a drive circuit 32 for driving the intermediate transfer belt driving motor 33 is directly proportional to the rotational velocity of the intermediate transfer belt driving motor 33. The controller 31 also computes the correction data δCLK(n) of the driving clock signal based on the angular velocity $\omega\mathbf{1}(n)$ and the angular velocity $\omega\mathbf{2}(n)$. The fluctuation in the travelling velocity of the intermediate transfer belt 16 due to the thickness variation of the intermediate transfer belt 16 can be cancelled out by controlling the travelling velocity based on the correction data δCLK(n) of the driving clock signal. Note that the correction data δCLK(n) includes the number of data sets obtained from one rotation of the intermediate transfer belt 16 (i.e., data obtained from an entire length of the endless intermediate transfer belt 16). One example of the method of computing the correction data is disclosed in Japanese Patent Application Laid-Open No. 2006-264976.

Next, a method of detecting a phase n of the intermediate transfer belt 16 and the operation of such a method are described. The phase of the intermediate transfer belt 16 is managed by a phase counter 28. A pulse signal output from the second rotary encoder 37 is supplied to the phase counter 28, which then counts the number of pulses of the pulse signal and transfers the counted value to the controller 31. When the counted value reaches the number of counts corresponding to one rotation of the intermediate transfer belt 16, the counted value is cleared off to 0.

The controller 31 determines a value n of the phase of the intermediate transfer belt 16 based on the counted value and computes the correction data δCLK(n). The computed correction data δCLK(n) are then stored in a storage section 40. The controller 31 also determines a value n of the phase of the intermediate transfer belt 16 based on the counted value, retrieves the correction data δCLK(n) corresponding to the value n of the phase of the intermediate transfer belt 16 from the storage section 40, and outputs the driving clock signal that has been corrected based on the correction data δCLK(n). Note that a generation source of the pulse signals supplied to the phase counter 28 is not limited to the second rotary encoder 37. The generation source may be one of the rollers supporting the intermediate transfer belt. Alternatively, the driving clock signal may be used as a substitute for the pulse signal. A timer may be used as a substitute for the phase counter. If the timer is used as the substitute for the phase counter 28, the time during which the intermediate transfer belt 16 is being driven is added up, and the aggregate value is used as a phase of the intermediate transfer belt 16.

Figure 3:
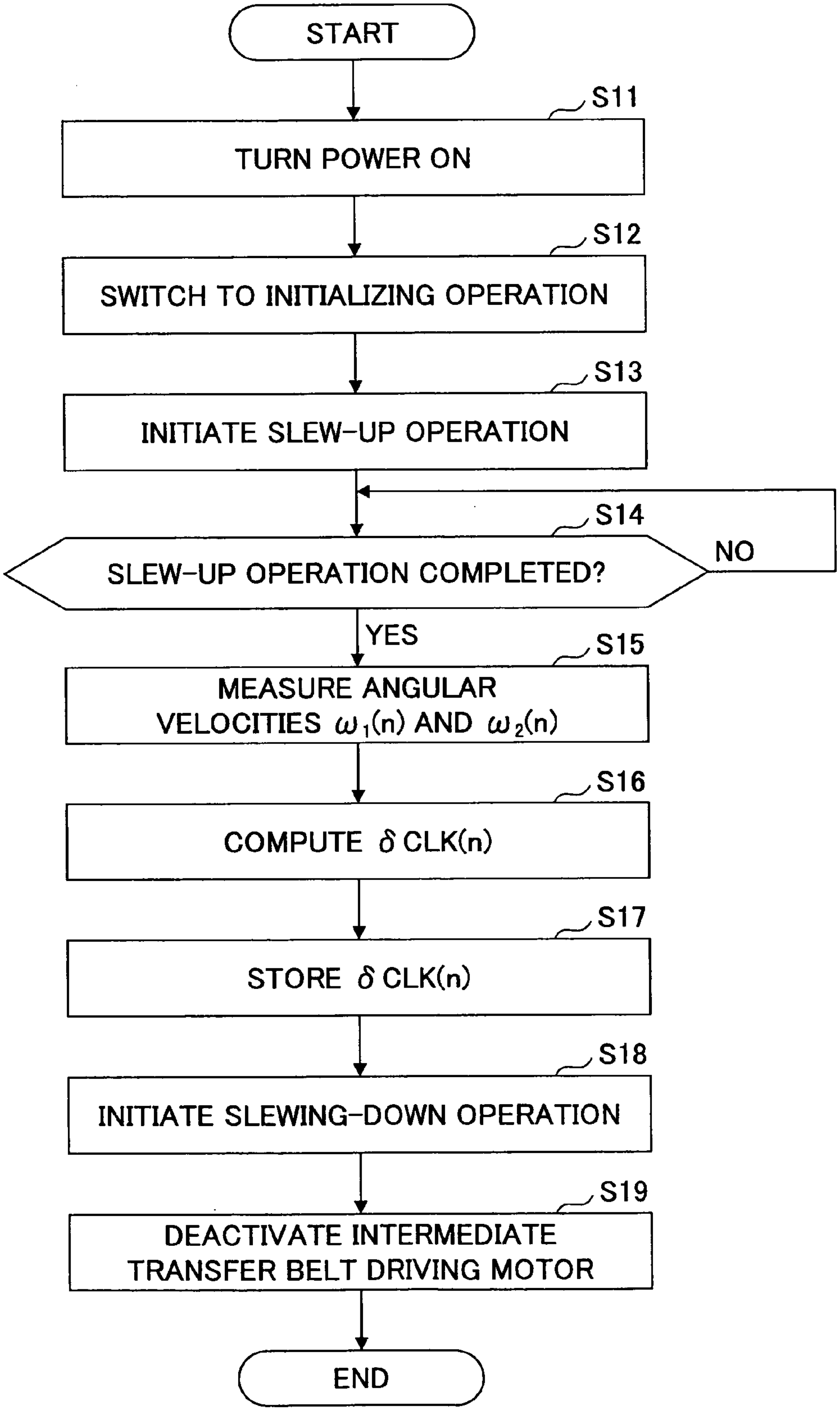
FIG. 3 is a flowchart illustrating a computation and storage sequence of correction data according to the embodiment of the invention.

FIG. 3 is a flowchart illustrating a computation and storage sequence of correction data δCLK(n) according to the embodiment of the invention.

At step S11, power of the color laser printer according to the embodiment is turned on.

At step S12, an operation mode is switched to a mode of “initializing operation” in order to warm up components of the color laser printer.

At step S13, a slew-up operation is activated. In the slew-up operation, the controller 31 activates the intermediate transfer belt driving motor 33. Since the intermediate transfer belt driving motor 33 is the stepping motor, the driving clock signals are gradually changed from a low frequency to a high frequency. Then, the controller 31 eventually conducts the slew-up operation on the intermediate transfer belt driving motor 33. This results in driving the intermediate transfer belt driving motor 33 at a constant velocity.

At step S14, whether the rotational velocity of the intermediate transfer belt has reached a predetermined velocity is checked so as to complete the slew-up operation. If the slew-up operation is completed, the process goes to the next step.

At step S15, angular velocities $\omega\mathbf{1}(n)$ and $\omega\mathbf{2}(n)$ of the corresponding rollers 38 and 39 are measured by driving the belt one rotation (complete phase), and the obtained angular velocities $\omega\mathbf{1}(n)$ and $\omega\mathbf{2}(n)$ are temporarily stored. Note that the phase counter 28 is ready for counting the pulse signal immediately after the power is turned on. The phase counter 28 starts counting when the pulses are generated by the second rotary encoder 37 based on the slew-up operation of the intermediate transfer belt 16. Thus, the angular velocities $\omega\mathbf{1}(n)$ and $\omega\mathbf{2}(n)$ can be measured at arbitrary times to compute the correction data δCLK after the completion of the slew-up operation of the intermediate transfer belt driving motor 33.

At step S16, the correction data δCLK for the driving clock signal are computed based on the angular velocities $\omega\mathbf{1}(n)$ and $\omega\mathbf{2}(n)$ obtained at step S15.

At step S17, the correction data δCLK obtained at step S16 are stored in the storage section 40.

At step S18, a slew-down operation is activated. In the slew-down operation, the driving clock signals are gradually changed from a high frequency to a low frequency At step S19, the intermediate transfer belt driving motor 33 is deactivated completely. Note that when the intermediate transfer belt driving motor 33 has been completely deactivated, the second rotary encoder 37 stops generating the pulses. As a result, the phase counter 28 stops counting the pulses. However, the phase counter 28 still retains the counted value obtained at this moment. Alternatively, in a case where the timer is used as the substitute for the phase counter 28, the value indicated by the timer indicates the travelling time of the belt (belt travelling time). In this case, the timer stops when the intermediate transfer belt driving motor 33 has been deactivated. However, the timer still retains the timer value obtained at this moment.

[A Method for Computing Correction Data]

Figure 4:
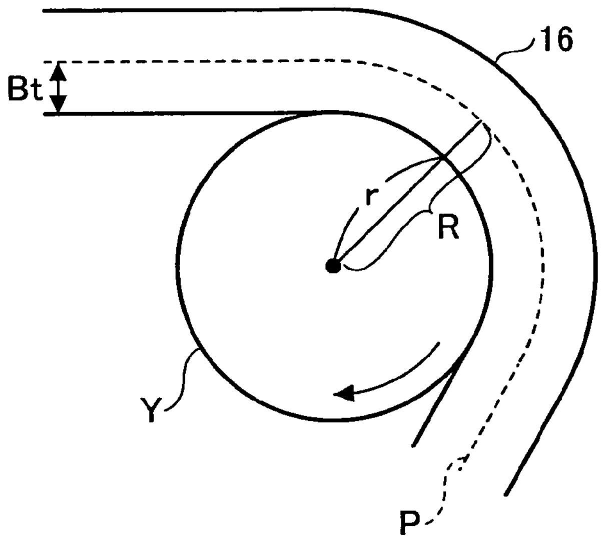
FIG. 4 is an enlarged diagram of a driving roller viewed from an axial direction of the driving roller.

FIG. 4 is an enlarged diagram of the belt 16 looped over a driving roller Y viewed from an axial direction of the driving roller Y. In FIG. 4, P indicates a pitch line of the belt, Bt indicates a distance between an inner surface of the belt and the pitch line P, r indicates a radius of the roller Y, R indicates the sum of the radius r of the roller Y and the distance Bt between the inner surface and the pitch line P. Note that in FIG. 4, it is presumed that the belt 16 is formed of a uniform material, and the pitch line P is located in the center of the belt in the thickness direction.

The relationship between a rotational angular velocity of the driving roller Y and a travelling velocity of the belt 16 is described with reference to FIG. 4. The travelling velocity of the belt 16 is determined based on the distance between a surface of the roller Y and the pitch line P, that is, a pitch line distance (hereinafter abbreviated as "PLD"). PLD corresponds to the distance Bt between the center of the belt in the thickness direction and the inner circumferential surface of the belt, provided that the belt is a single layered belt formed of uniform material and the absolute values in degrees of the expansion and contraction are approximately the same between the inner surface side and the outer surface side of belt 16. This can be expressed as: PLD=Bt Accordingly, in the single layered belt, there is provided a constant relationship between PLD and the thicknesses of the belt, and hence the travelling velocity of the belt 16 is determined based on the fluctuation in the thickness of the belt 16. However, if the belt is formed of plural layers, elasticity may vary between hard and soft layers.

Thus, PLD corresponds to a distance between the position shifted from the center of the belt in the thickness direction and the surface of the roller Y. Further, PLD may also vary with an angle of the belt 16 at which the belt is looped over the driving roller Y (hereinafter also referred to as "belt loop angle").

This is expressed by the following equation (1).

$$PLD=PLD_{ave}+f(n) \tag{1}$$

In the equation (1), $PLD_{ave}$ represents the mean of PLDs that are obtained from one rotation of the belt (i.e., an entire length of the circular endless belt). For example, if the mean of the thickness of the single layered belt over the entire length is 100 μm, the $PLD_{ave}$ results in 50 μm. Further, f(n) is a function indicating the fluctuation of PLD for one rotation of the belt. In the equation (1), n is a natural number representing a phase of the intermediate transfer belt 16.

The relationship between the travelling velocity V of the belt and the rotational angular velocity ω of the driving roller Y is expressed by the following equation (2).

$$v=\{r+PLD_{ave}+\kappa f(n)\}\omega(n) \tag{2}$$

In the equation (2), r represents a radius r of the driving roller Y. Degrees by which f(n), indicating the fluctuation of PLD, affects the relationship between the travelling velocity or the travelling distance of the belt 16 and the rotational angular velocity or rotational angular displacement of the roller Y may vary with a contact condition of the belt 16 on the roller Y or an amount of the belt looped over the roller Y. The degree to which the aforementioned relationship is affected is represented by a PLD effective coefficient κ.

In the equation (2), the formula enclosed by braces indicates an effective roller radius, and a static part "$r+PLD_{ave}$" indicates an effective roller radius R. Further, in the equation (2), f(n) indicates a PLD fluctuation.

[Method for Detecting PLD Fluctuation]

Figure 5:
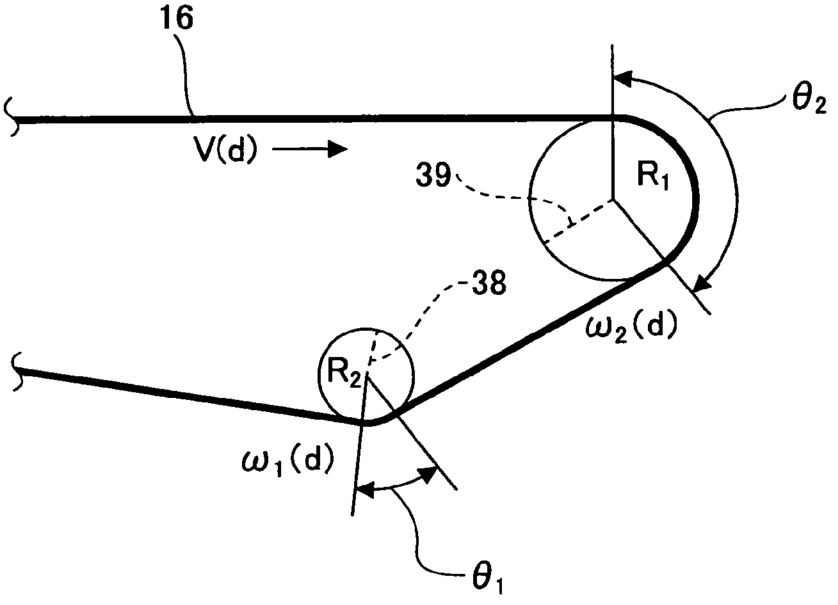
FIG. 5 is a schematic diagram illustrating a first driven roller and a second driven roller according to the embodiment of the invention.

FIG. 5 is a schematic diagram illustrating a major portion of the belt device in the belt driving control device in FIG. 1. The belt device includes the belt 16, and a first driven roller 38 and a second driven roller 39 over which the belt is looped. The belt 16 is looped over the first driven roller 38 at a belt loop angle of θ1 whereas the belt 16 is looped over the second driven roller 39 at a belt loop angle of θ2. The belt endlessly travels in a direction shown by arrow V(d) in FIG. 5. Rotary encoders are individually provided on the first driven roller 38 and the second driven roller 39 as detecting components. Any components capable of detecting the rotational angular displacements and rotational angular velocities of the rollers 38 and 39 may be provided as the rotary encoders. In this embodiment, the components capable of detecting rotational angular velocities $\omega\mathbf{1}(n)$ and $\omega\mathbf{2}(n)$ are employed. One example of such a rotational encoder includes an optical encoder disclosed in the related art. Such optical encoders optically detect timing marks concentrically formed at constant intervals on disks each made of a transparent material such as glass or plastic, and are coaxially fixed to the rollers 38 and 39. Another example of the rotational encoder includes a magnetic encoder. Such magnetic encoders are coaxially fixed to the rollers 38 and 39 and include magnetic heads to detect timing marks concentrically and magnetically formed on disks made of a magnetic material. Still another example of the rotational encoder includes a tacho-generator disclosed in the related art. In this embodiment, the rotational angular velocities of the rollers 38 and 39 may be obtained by measuring intervals at which pulses are consecutively generated from the rotary encoders and computing the reciprocal number of the measured intervals. Note that the rotational angular displacements of the rollers 38 and 39 may be obtained by counting the number of pulses consecutively generated from the rotary encoders.

The following equations (3) and (4) respectively represent the relationship between the rotational angular velocity ω1(*n*) of the first driven roller 38 and the travelling velocity V(n) of the belt when the belt is located at the phase n, and the relationship between the rotational angular velocity ω2(*n*) of the second driven roller 39 and the travelling velocity V(n) of the belt when the belt is located at the phase n.

$$V(n)=\{R_1+\kappa_1 f(n)\}\omega_1(n) \tag{3}$$

$$V(n)=\{R_2+\kappa_2 f(n+\alpha)\}\omega_2(n) \tag{4}$$

In the above equations, R1 represents an effective roller radius of the first driven roller 38, and R2 represents an effective roller radius of the second driven roller 39. In addition, κ1 represents an effective PLD fluctuation coefficient of the first driven roller 38 determined based on the loop angle θ1 at which the belt is looped over the first driven roller 38, the material of the belt, and the structure of the layers of the belt. The PLD represents a parameter that determines degrees by which the belt travelling velocity V(n) is affected.

Likewise, κ2 represents an effective PLD fluctuation coefficient of the second driven roller 39. The degrees by which the PLD fluctuation affects the travelling velocity of the belt (belt displacement) differs from the degrees by which the PLD fluctuation affects the rotational angular velocities of the rollers 38 and 39. This is because the flexural modulus of the belt that is looped over the roller 38 differs from the flexural modulus of the belt that is looped over the roller 39 (flexural deformation), and the amount of the belt that is looped over the roller 38 differs from that of the belt looped over the roller 39. Thus, individually different effective PLD fluctuation coefficients are set to the relational expressions of the rollers 38 and 39 in equations (3) and (4). Note that the effective PLD fluctuation coefficients κ1 and κ2 generally have equal values provided that the belt is formed of a uniform material, has a single layered structure, and has sufficiently large belt loop angles θ1 and θ2.

Further, the f(n) indicates the PLD fluctuation of the belt that passes through a specific position of the travelling path when the belt is located at the phase n. The f(n) represents a periodic function having the same periodic pattern as the travel of the belt for one rotation, and indicates a deviation from the mean $PLD_{ave}$ of the PLDs in the circumferential direction of the belt obtained from one rotation of the belt. The specific position is defined as a portion of the belt that is looped over the second driven roller 39. Thus, if the phase n is 0, then PLD fluctuation amount of the portion of the belt that is looped over the second driven roller 39 is f(0). Note that time function f(t) may also be used in place of the phase function f(n) as the function of the PLD fluctuation. The f(n) and f(t) may be mutually interchangeable.

Further, α represents a phase difference of the belt 16 between the first driven roller 38 and the second driven roller 39. The phase difference α is hereinafter also referred to as "lagging phase". The lagging phase a may either be a positive or a negative value determined based on a positional relationship between the rollers 38 and 39, and the travelling direction of the belt. The α indicates a phase difference between the PLD fluctuation f(n) of the portion of the belt looped over the first driven roller 38 and the PLD fluctuation f(n+α) of the portion of the belt looped over the second driven roller 39.

It may be difficult to compute the mean $PLD_{ave}$ of the PLDs based on the structure, the material, or physical properties of the belt alone. However, the mean $PLD_{ave}$ of the PLDs may be computed by carrying out a simple belt driving test to compute the mean of the belt travelling velocities.

The mean of the belt travelling velocities when driving the driving roller at a constant rotational angular velocity is obtained by:

(a radius R01 of the driving roller+$PLD_{ave}$)*a constant rotational angular velocity ω0

The mean of the belt travelling velocities is obtained by:

(circumferential length of the belt/time required for driving the belt travel one rotation)

The belt circumferential length and the time required for driving the belt travel one rotation can be measured accurately. Thus, the mean of the belt travelling velocities when driving the driving roller at a constant rotational angular velocity can also be accurately computed. Further, since the radius R01 and the constant rotational angular velocity ω0 of the driving roller can also be accurately obtained, the accurate $PLD_{ave}$ can thereby be obtained. Note that the method for computing $PLD_{ave}$ is not limited to that described above.

The travelling velocity of the belt V(n) at a portion of the belt looped over the second support roller 39 when the belt is located at the phase n is the same as the travelling velocity of the belt V(n) at a portion of the belt looped over the first support roller 38 when the belt is located at the phase n. Thus, the following equation (5) may be obtained based on the aforementioned equations (3) and (4).

$$\omega_2(n)=\frac{\{R_1+\kappa_1 f(n)\}}{\{R_2+\kappa_2 f(n+\alpha)\}}\omega_1(n) \tag{5}$$

Accordingly, the PLD fluctuation f(n) is sufficiently small for the effective roller radii R1 and R2, and hence the equation (5) may approximate to the following equation (6).

$$\omega_2(n)\cong\frac{R_1}{R_2}\omega_1(n)+\frac{R_1}{R_2}\omega_1(n)\left\{\frac{\kappa_1}{R_1}f(n)-\frac{\kappa_2}{R_2}f(n+\alpha)\right\} \tag{6}$$

In the PLD fluctuation detecting method, the first and second driven rollers 38 and 39 are closely arranged with each other in the circumferential direction of the belt. Specifically, if the first and second driven rollers 38 and 39 are closely arranged with each other such that the lagging phase α is sufficiently small, the f(n) can be approximated by the f(n+α). As illustrated in the aforementioned detecting method, when approximating the f(n) by the f(n+α), there will be an error between the PLD fluctuation f(n) obtained by the aforementioned detecting method and the actual PLD fluctuation. However, if the fluctuation in the travelling velocity of the belt 16 or shifts in the travelling position of the belt 16 result from the error but are within an acceptable range, there may be little effect on approximating the f(n) by the f(n+α) in practical application. Thus, the following equation (7) can be obtained by the approximation of the f(n) by the f(n+α), which is represented by f(n)=f(n+α).

$$f(n) \cong \frac{\omega_2(n) - \frac{R_1}{R_2}\omega_1(n)}{\frac{R_1}{R_2}\omega_1(n)\left\{\frac{\kappa_1}{R_1} - \frac{\kappa_2}{R_2}\right\}} \tag{7}$$

As is clear from the equation (7), the PLD fluctuation f(n) can be computed based on the rotational angular velocities ω1(*n*) and ω2(*n*) of the respective first and second driven rollers 38 and 39 when the belt is located at the phase n. Note that if the belt 16 is driven such that the rotational angular velocity ω1(*n*) of the first driven roller 38 is constant, the rotational angular velocity ω1(*n*) will have a constant value. Thus, the PLD fluctuation f(n) may be computed by detecting the rotational angular velocity ω2(*n*) of the second driven roller 39 alone. Further, it is presumed that the PLD fluctuation includes noise so that the PLD fluctuation f(n) may be obtained via a noise removing filtering process. In this case, all the fluctuation frequency components in the filtered PLD fluctuation f(n) may be corrected. However, the correction may be accurately made such that the error falls within an acceptable range, provided that the lagging phase α is little affected by the frequency in the relationship between a cycle of one fluctuation frequency component and the lagging phase α.

Note that the equation (7) is an approximate equation in which f(n) is obtained by assigning zero to α. However, in order to compute the f(n) accurately, 0 to $n_{max}$ are individually assigned to n in the equation (6) to prepare plural equations (6), and compute ($n_{max}$+1)-dimensional simultaneous linear equations. Any existing solutions that can rapidly solve such simultaneous linear equations may be used. Note that if α is determined such that ($n_{max}$+1) results in an integral multiplication of a (i.e., mα=($n_{max}$+1)), dimensions of the simultaneous linear equations will be m, thereby dramatically reducing the solution time. Further, the simultaneous linear equations may be solved by hardware provided that m lagging components are prepared for α phases. Note that even if ($n_{max}$+1) is not exactly the integral multiplication, the error is too small to affect the result. Various other solutions may be used for solving f(n).

As described above, the PLD fluctuation f(n) can be computed for all of the phases of the belt 16 (i.e., from n=0 to n=$n_{max}$).

Figure 6:
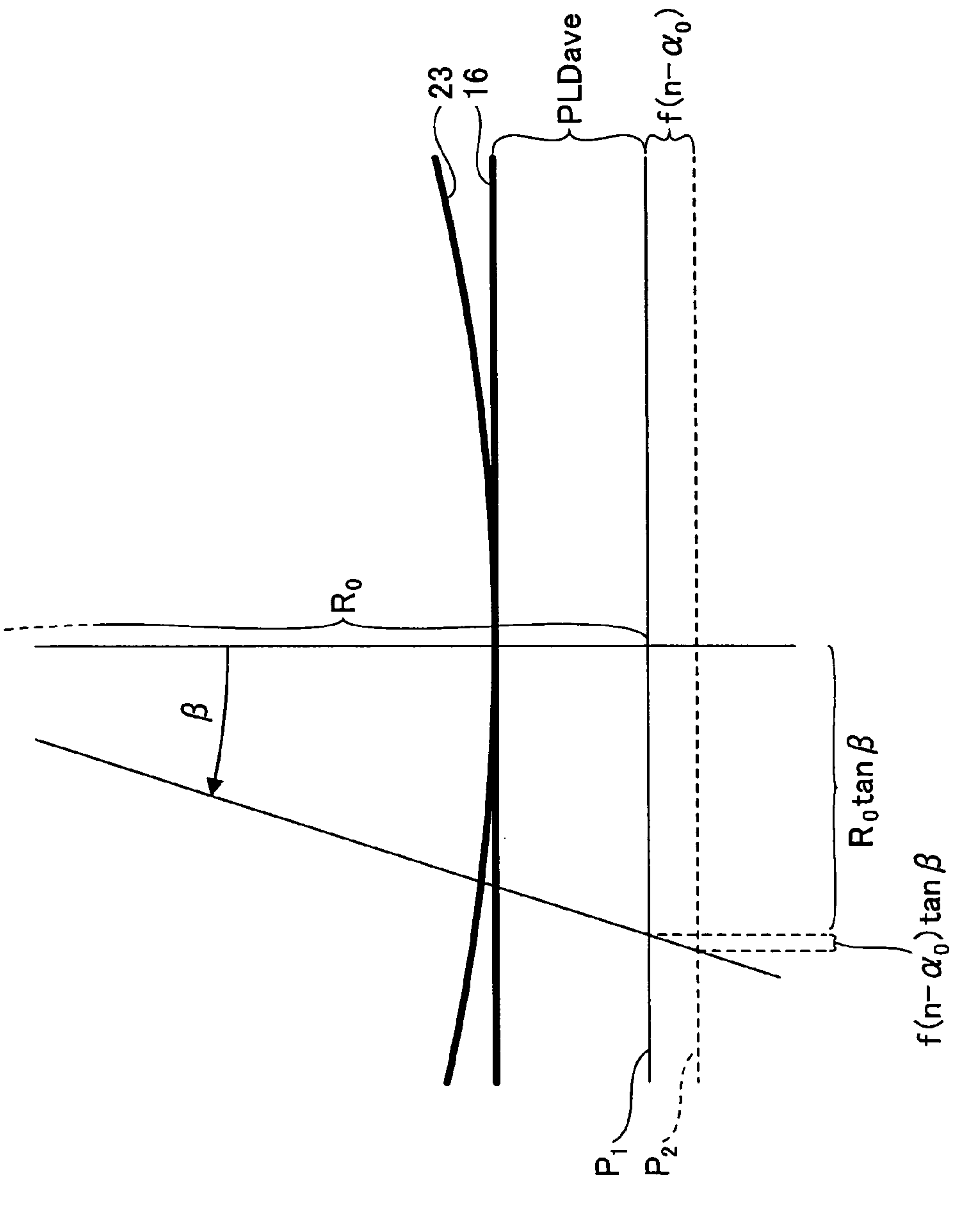
FIG. 6 is an explanatory diagram illustrating an effect of PLD (Pitch Line Distance) fluctuation on a travelling distance of an intermediate transfer belt according to the embodiment of the invention.

FIG. 6 is a diagram illustrating fluctuation in the travelling amount of the belt 16 per pulse generated by the intermediate transfer belt driving motor 33 as a stepping motor based on the PLD fluctuation f(n). First, $\alpha_0$ is determined as a phase difference between a specified position of the belt phase and a position at which the driving roller 23 is brought into contact with the belt 16. R0 is an effective radius of the driving roller 23. β is determined as a rotational angular velocity of the driving roller 23 for each pulse interval of the intermediate transfer belt driving motor 33. P1 represents an average pitch line of the belt 16. P2 represents a pitch line of the belt 16 at the phase $n_{-\alpha 0}$.

f(n−α) is defined as the PLD fluctuation at a position where the driving roller 23 is in contact with the belt 16 when the belt is at the phase n. $t_{ave}$ is defined as a normal pulse interval when the pitch line is located at P1. The travelling velocity $V_{ave}$ of the belt when no PLD fluctuation is obtained (i.e., f (n−α0)=0) is shown by the following equation (8).

$$V_{ave} = \frac{R_0 \tan\beta}{t_{ave}} \tag{8}$$

The travelling distance of the belt is incremented by f(n−α0)tan β when the pitch line is located at P2 in FIG. 6, due to the PLD fluctuation f(n−α0). The travelling velocity V(n) of the belt 16 in this case is shown by the following equation (9) provided that the pulse interval is $t_{ave}$+δCLK(n).

$$V(n) = \frac{R_0 \tan\beta + f(n - \alpha_0)\tan\beta}{t_{ave} + \delta CLK(n)} \tag{9}$$

In order to maintain the travel of the belt at a constant velocity, the velocities in the equations (8) and (9) need to be the same. That is, the velocities need to have a relationship represented by $V_{ave}$=V(n), which is represented by the following equation (9).

$$\frac{R_0 \tan\beta}{t_{ave}} = \frac{R_0 \tan\beta + f(n - \alpha_0)\tan\beta}{t_{ave} + \delta CLK(n)} \tag{10}$$

Solving the equation (10) for δCLK(n) results in the following equation (11).

$$\delta CLK(n) = \frac{f(n - \alpha_0)}{R_0} t_{ave} \tag{11}$$

Thus, the following equation (12) is obtained based on the equations (7) and (11).

$$\delta CLK(n) = \frac{\omega_2(n - \alpha_0) - \frac{R_1}{R_2}\omega_1(n - \alpha_0)}{\frac{R_1}{R_0 R_2}\omega_1(n - \alpha_0)\left\{\frac{\kappa_1}{R_1} - \frac{\kappa_2}{R_2}\right\}} t_{ave} \tag{12}$$

In the equation (12), values of δCLK($n_{max}$) to δCLK(0) are actually computed, and the computed values are stored in the storage section 40. The pulse interval for actually driving the intermediate transfer belt driving motor is determined as $t_{ave}$+δCLK(n) when the intermediate transfer belt 16 is located at the phase n. Note that the equation (12) includes approximate equation obtained by the equation (7). Thus, if the f(n) is computed by another method described above except the equation (12), the obtained f(n) is assigned to the equation (11) to thereby compute δCLK($n_{max}$).

Note that in the aforementioned embodiments, the fluctuation in the travelling velocity of the belt is computed by utilizing the two driven rollers 38 and 39 having mutually different radii. However, the travelling velocity of the belt may be directly detected by an optical device, and the PLD fluctuation f(n) may then be computed based on the detected fluctuation of the travelling velocity. In such a case, the correction data δCLK(n) of the driving clock signal may be computed based on the directly detected fluctuation data on the travelling velocity of the belt.

[Updating Correction Data]

Next, a method for updating the correction data δCLK(n) is described. A cycle in which the count values of the phase counter 28 are obtained from one rotation is determined based on a circumferential length of the intermediate belt 16 and a desired value of a diameter of the second rotary encoder 37. However, in practice, the circumferential length of the intermediate transfer belt 16 and the diameter of the rotary encoder 37 may be varied, or there may be some slight slipping between the roller 23 and the intermediate transfer belt 16. Thus, the cycle in which the count values are counted by the phase counter 28 for one rotation of the belt may not be matched with a rotational cycle in which the intermediate transfer belt is driven to travel one rotation. Accordingly, if the phase of the intermediate transfer belt 16 is managed by the phase counter 28, there may be a difference between the phase counted by the phase counter 28 and the actual phase of the intermediate transfer belt 16. This difference gradually increases as the intermediate transfer belt 16 is rotated. Since the value of the correction data δCLK(n) is retrieved from the storage section 40 based on the counted value counted by the phase counter 28, there may also be a difference between the correction data δCLK(n) and the actual phase of the intermediate transfer belt 16. Thus, the correction data δCLK(n) may need updating at some intervals. According to this embodiment, the angular velocities $\omega\mathbf{1}(n)$ and $\omega\mathbf{2}(n)$ are measured for every two rotations of the intermediate transfer belt 16 to thereby compute the correction data δCLK(n). The correction data δCLK(n) are constantly updated while the intermediate transfer belt 16 is being driven to travel at a constant velocity. In this case, the existing data stored in the storage section 40 are retrieved, newly computed correction data δCLK(n) are added to the retrieved data, and the added data are then stored in the storage section 40 again.

Further, the phase $n_{max}$ may be changed due to deterioration of the components with aging or ambient temperatures. In order to correct the phase $n_{max}$, the count values when the belt 16 is accurately driven to travel one rotation may need to be obtained. A reference mark is provided on the belt for detecting as to whether the belt has traveled one rotation. One rotation of the belt is detected by sensing the reference mark on the belt, and the phase $n_{max}$ can be corrected accordingly. The correction of the phase $n_{max}$ is suitably made when the image forming apparatus (printer) is switched to the initializing operation mode, or while the intermediate transfer belt 16 is being rotated. Note that the reference mark is not a home position of the belt.

[Activating Operation of Motor]

Figure 7:
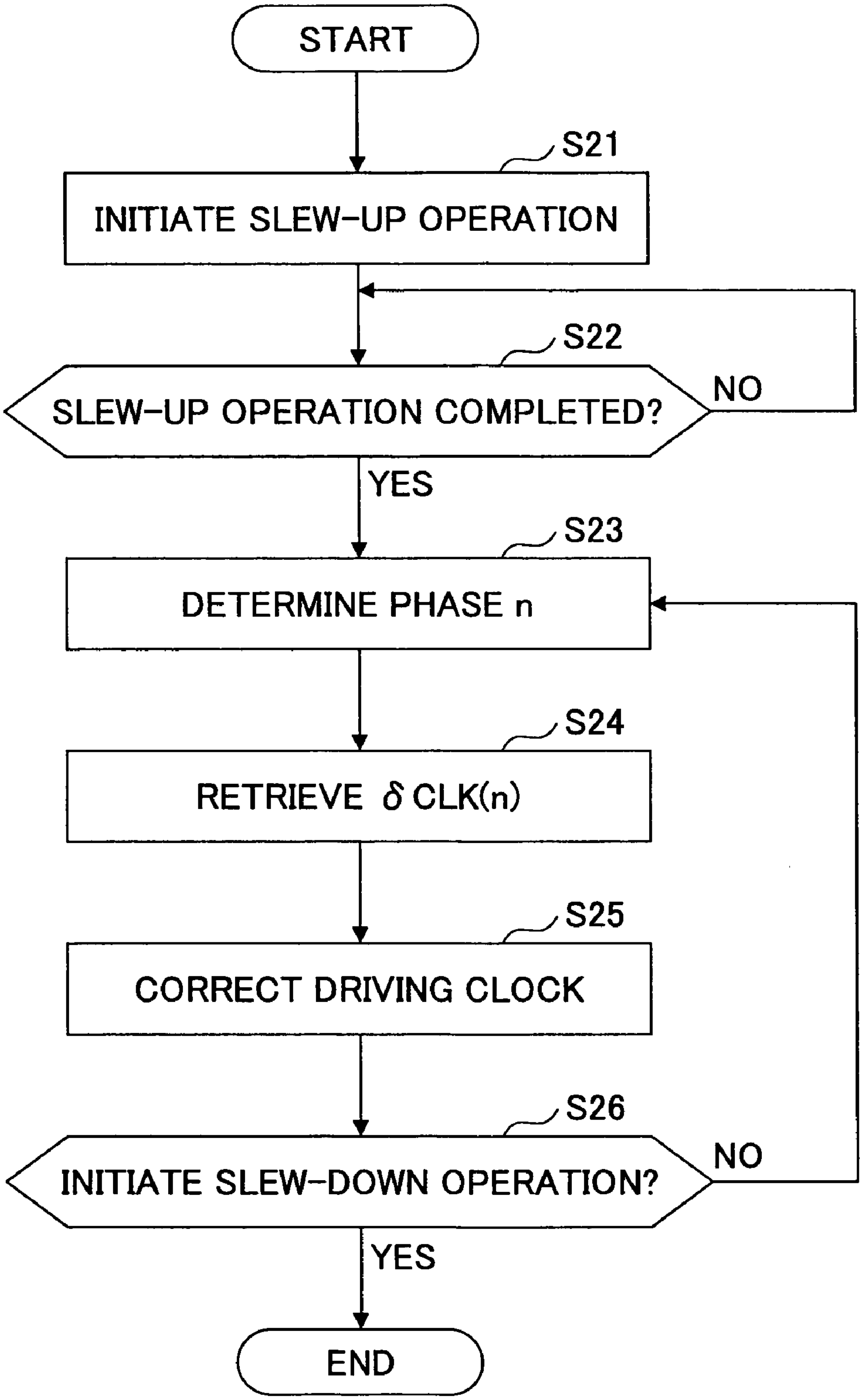
FIG. 7 is a flowchart illustrating an activating operation sequence of a driving motor of the intermediate transfer belt.
Figure 8:
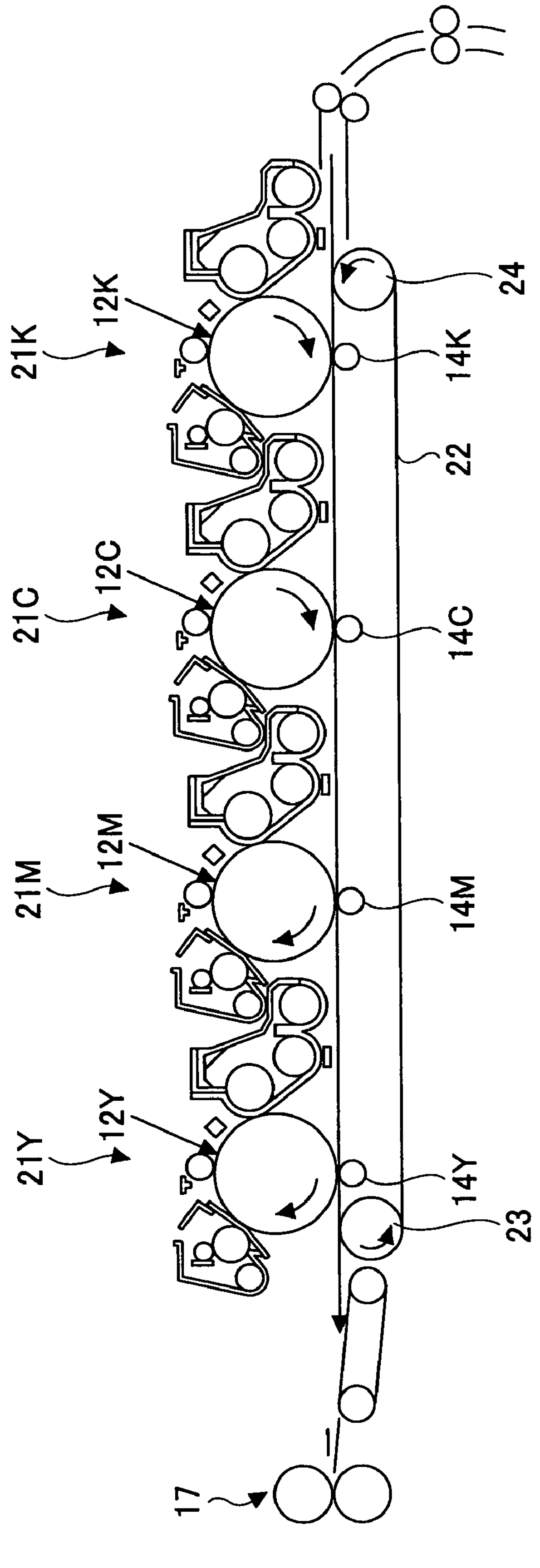
FIG. 8 is a diagram illustrating configuration of a direct transfer system according to a related art.
Figure 9:
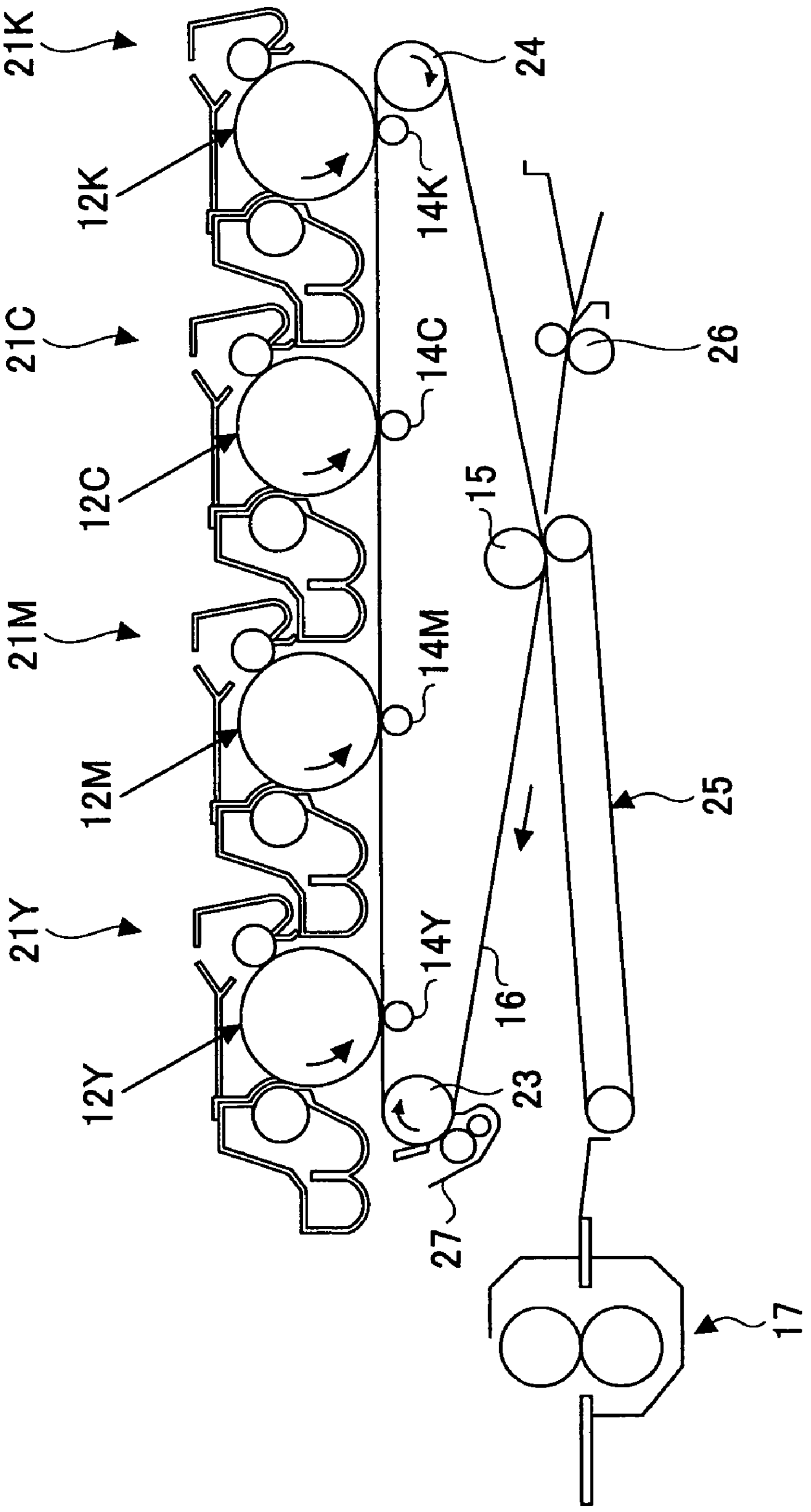
FIG. 9 is a diagram illustrating configuration of an intermediate transfer system according to the related art.

FIG. 7 is a flowchart illustrating an activating operation sequence of the intermediate transfer belt driving motor 33 after the initializing operation has been completed. A trigger to activate the intermediate transfer belt driving motor 33 after the initializing operation has been completed may be the activation of printing operation when the image forming apparatus has received printing instructions via an operation section or an unshown superordinating apparatus, or may be the activation of an adjusting operation of the image forming apparatus instructed by the program of the image forming apparatus.

At step S21, a slew-up operation is activated. When the slew-up operation is activated and the intermediate transfer belt 16 is driven, the pulses are generated by the second rotary encoder 37 and the phase counter 28 starts counting the generated pulses again. At this time, the phase counter 28 starts counting the pulses from the counted value obtained at the time the phase counter 28 has stopped counting the pulses the last time.

At step S22, whether the slew-up operation has been completed is checked. If the slew-up operation has been completed, the process goes to the next step.

At step S23, the phase of the intermediate transfer belt is determined. On activating the intermediate transfer belt driving motor 33 after the initializing operation has been completed, the previously computed correction data δCLK(n) have already been stored in the storage section 40. Thus, the controller 31 determines the phase n of the intermediate transfer belt 16 based on the counted value transferred from the phase counter 28 after the intermediate transfer belt driving motor 33 has reached a constant rotational velocity by the slew-up operation. On turning the power on, the phase counter 28 is continuously counting the number of pulses of the pulse signal generated by the second rotary encoder 37. At the time the counted value has reached the number of counts corresponding to one rotation of the intermediate transfer belt 16, the counted value is cleared off to 0. Thus, the value n of the phase of the intermediate transfer belt 16 can be determined based on the counted value.

At step S24, the correction data δCLK(n) are retrieved from the storage section 40.

At step S25, the driving clock is corrected based on the retrieved correction data δCLK(n). The intermediate transfer belt driving motor 33 is capable of activating the correction control to cancel out the fluctuation in the velocity of the intermediate transfer belt 16 due to its thickness variation immediately after the completion of the slew-up operation of the intermediate transfer belt driving motor 33.

At step S26, after having transferred the images, the slew-down operation is activated and operation of the image forming apparatus is deactivated.

As described above, the belt driving control device according to the embodiments of the invention includes a belt, a driving roller over which the belt is looped to transmit drive force to the belt, a belt phase detecting section to detect a phase of the belt and retain information on the phase of the belt while the belt is not being driven, a correction amount computing section to compute a correction amount of a belt travelling velocity to cancel out fluctuation in the belt travelling velocity corresponding to the phase of the belt, a storage section to store the correction amount of the belt travelling velocity corresponding to the phase of the belt, and a driving control section to retrieve the correction amount of the belt travelling velocity corresponding to the phase of the belt from the storage section based on information on the phase of the belt detected from the belt phase detecting section, and control drive of the driving roller to cancel out the fluctuation in the belt travelling velocity based on the correction amount of the belt travelling velocity retrieved from the storage section.

With the belt driving control device having such a configuration, since the current phase of the belt is immediately detected on activating the belt, the drive of the belt is controlled based on the detected phase. Thus, the belt driving control device having this configuration can reduce the first print time without waiting while the belt is being driven to travel one rotation to reach the home position again.

Accordingly, the image forming processing is rapidly completed by following the aforementioned operations.

In the image forming apparatus having the belt driving control device according to the embodiment, the first print time may be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, and the organization of such examples in the specification does not relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-237136 filed on Sep. 16, 2008 and Japanese Priority Patent Application No. 2009-206160 filed on Sep. 7, 2009, the entire contents of which are hereby incorporated herein by reference.

What is claimed is:

1. A belt driving control device comprising:

a belt;

a driving roller over which the belt is looped and configured to transmit drive force to the belt to be traveled;

a belt phase detecting section configured to detect a phase of the belt;

a correction amount computing section configured to compute a correction amount of a belt travelling velocity corresponding to the detected phase of the belt for cancelling out fluctuation in the belt travelling velocity corresponding to the detected phase of the belt;

a storage section configured to store the correction amount of the belt travelling velocity corresponding to the detected phase of the belt; and a driving control section configured to retrieve the stored correction amount of the belt travelling velocity corresponding to the detected phase of the belt from the storage section, and control drive of the driving roller to cancel out the fluctuation in the belt travelling velocity based on the retrieved correction amount of the belt travelling velocity corresponding to the detected phase of the belt.

2. The belt driving control device as claimed in claim 1, further comprising:

a plurality of driven rollers configured to support the belt; and a plurality of angular velocity detecting sections configured to individually detect angular velocities of the driven rollers, wherein the correction amount computing section computes the correction amount of the belt travelling velocity corresponding to the detected phase of the belt based on the detected angular velocities of the driven rollers.

3. The belt driving control device as claimed in claim 2, wherein the driven rollers are rotated in response to travel of one of the driving roller and the belt.

4. The belt driving control device as claimed in claim 2, wherein the belt phase detecting section detects rotational amounts of the driven rollers, and retains, while the driven rollers are not being driven, information on the rotational amounts detected at the time the driven rollers are stopped.

5. The belt driving control device as claimed in claim 1, wherein the belt phase detecting section detects travelling time of the belt to determine the phase of the belt based on the detected travelling time of the belt, and retains, while the belt is not being driven, information on the travelling time of the belt detected at the time the belt is stopped.

6. An image forming apparatus comprising the belt driving control device as claimed in claim 1.

7. A method for controlling drive of a belt looped over a driving roller that transmits drive force to the belt, the method comprising:

detecting a phase of the belt;

computing a correction amount of a belt travelling velocity corresponding to the detected phase of the belt for cancelling out fluctuation in the belt travelling velocity corresponding to the detected phase of the belt;

storing the correction amount of the belt travelling velocity corresponding to the detected phase of the belt;

retrieving the stored correction amount of the belt travelling velocity corresponding to the detected phase of the belt; and controlling the driving roller to cancel out the fluctuation in the belt travelling velocity based on the retrieved correction amount of the belt travelling velocity corresponding to the detected phase of the belt.

* * * * *